United States Patent [19]

Watkins

[11] Patent Number: 4,615,811

[45] Date of Patent: Oct. 7, 1986

[54] VACUUM PUMP OIL RECOVERY PROCESS

[76] Inventor: Lawrence J. Watkins, 1000 Toney Dr., Huntsville, Ala. 35802

[21] Appl. No.: 693,399

[22] Filed: Jan. 22, 1985

[51] Int. Cl.[4] .......................................... B01D 23/24
[52] U.S. Cl. ................................... 210/797; 210/799; 134/25.1; 134/26; 134/29; 134/30; 202/170
[58] Field of Search ............... 210/722, 798, 791, 797, 210/799, 197.1, 195.1, 411; 134/25.1, 26, 29, 30, 12, 40, 10, 11, 31; 202/170; 208/264

[56] References Cited

U.S. PATENT DOCUMENTS 3,428,412 2/1969 Gilbert et al. ........................ 134/11
4,341,567 7/1982 Roehl ................................... 134/11
4,443,344 4/1984 Lewis ................................... 210/791
4,444,625 4/1984 Smith ................................... 134/12

Primary Examiner—Andrew H. Metz
Assistant Examiner—Sharon T. Cohen
Attorney, Agent, or Firm—Stanton E. Collier; Donald J. Singer; William J. O'Brien

[57] ABSTRACT

A novel treatment method for recovering halogenated vacuum pump oils such as chlorotrifluoroethylene, from contaminated filter papers. The process utilizes a trichlorotrifluoroethane (TCTFE) solvent and water mixture to extract the oil followed by vacuum distilling the resulting extractive.

2 Claims, 4 Drawing Figures

VACUUM PUMP OIL RECOVERY PROCESS

STATEMENT OF GOVERNMENT INTEREST

The invention described herein may be manufactured and used by or for the Government for governmental purposes without the payment of any royalty thereon.

BACKGROUND OF THE INVENTION

This invention relates to a method for treating paper filters contaminated by oil, rust particles and other undesirable contaminants. In a more particular aspect, this invention concerns itself with a method for recovering halogenated vacuum pump oils, such as chlorotrifluoroethylene, from contaminated paper filters which are used in oil purification processes.

At the present time, a number of oil purification processes utilize a vacuum technique to affect purification of oils. Generally, the vacuum pump used to create the necessary vacuum uses a halogenated vacuum pump oil which flows through a series of paper filters. After a period of time, the paper filters become clogged with contaminants from the pump oil and are no longer effective.

As a result, the filters were disposed of even though they contained substantial amounts of oil trapped by the filters' fibers. Disposing of the paper filters, however, constituted a wasteful and expensive practice since large amounts of the vacuum pump oil were discarded along with the filters.

It became extremely important, therefore, that a system be developed that would eliminate the waste involved in discarding paper filters and provide a means for lowering the costs involved in oil purification procedures. The need for such a system that is safe, reliable, inexpensive and ecologically acceptable becomes of paramount importance when one considers the considerable cost involved in using vacuum pump halocarbon oils which are relatively expensive. As a result of this need, a considerable research effort was undertaken in an attempt to overcome this problem and provide a means for recovering the vacuum pump oil in a non-contaminated condition for subsequent reuse in a vacuum pump.

As a result of that research effort, it was found that the problem of removing vacuum pump oil from paper filters, along with the simultaneous problem of eliminating contaminants from the vacuum pump oil itself, could be accomplished by first submerging the oil-saturated paper filters into an extraction bath containing a mixture of trichlorotrifluoroethane and water followed by vacuum distilling the extractive to recover the halocarbon pump oil in reasonably pure and uncontaminated form.

SUMMARY OF THE INVENTION

The present invention concerns itself with a novel method for recovering halocarbon vacuum pump oils from oil-contaminated paper filters. The process utilizes a trichlorotrifluoroethane (TCTFE) and water extraction bath followed by vacuum distilling the resulting extractives. In essence, the oil-saturated paper filters, which are normally discarded after use, are placed in a conventional extraction vessel and submerged in a bath of the extraction mixture. The extraction mixture is then continuously pumped in a countercurrent flow through the filter papers to extract the halocarbon pump oil and other contaminants from the paper filters. After a sufficient period of time has elapsed, the pump is shut off and an extracting solution of the recovered pump oil and (TCTFE) rests at the bottom of the extraction vessel with water floating on top of the extractive mixture. The entire extractive solution is then removed from the extraction vessel and placed in a separator vessel to remove the water constituent. The remaining portion of the extractive is then filtered to remove particulate material and then heated to boiling to remove substantially all of the (TCTFE) leaving a residue containing the recovered pump oil and a small amount of (TCTFE). The resulting solution is then vacuum distilled to remove the residual (TCTFE) from the recovered pump oil resulting in a purified halocarbon vacuum pump oil of about 99 percent purity. The recovered vacuum pump oil is then ready for reuse in a vacuum pump system.

Accordingly, the primary object of this invention is to provide a method for recovering a vacuum pump halocarbon oil from an oil saturated paper filter.

Another object of this invention is to recover a vacuum pump halocarbon oil from paper filters which were heretofore discarded after being utilized in oil purification processes.

Still another object of this invention is to provide a method for recovering a substantially contaminant-free vacuum pump halocarbon oil from paper filters for subsequent reuse in vacuum pump systems.

The above and still other objects and advantages of the present invention will become more readily apparent upon consideration of the following detailed description thereof when viewed in conjunction with the accompanying drawings.

DESCRIPTION OF THE PREFERRED EMBODIMENT

Pursuant to the above-identified objects, the present invention concerns itself with a process for recovering halogenated vacuum pump oil from paper filters. Paper filters are presently being used in various oil recovery and oil purification processes as well as in vacuum pumps. After a period of operation, the paper filters become saturated with the pump oil and contaminated with dirt and fine metal fibers. Vacuum pumps generally utilize halogenated oils such as chlorotrifluoroethylene oils which are relatively expensive. Heretofore, no method was used to recover the vacuum pump oil from the filters and they were discarded after being removed from the vacuum pump system. As a result, considerable amounts of oil were lost resulting in substantial financial losses.

However, in accordance with the general concept of this invention, the problems associated with discarding the vacuum pump oils were overcome by a process in which the halocarbon vacuum pump oil is recovered from the paper filters by submerging the oil-saturated paper filters in a bath containing a trichlorotrifluoroethane (TCTFE) extraction mixture. After a period of time, depending on the degree of oil saturation, the oil is extracted from the paper filters and the resulting extractive solution comprises a mixture of oil and (TCTFE). The extractive is then distilled to remove the (TCTFE) component. The end result is a product that is about 99 percent pure vacuum pump oil ready for re-use in a vacuum pump system. This enables the vacuum pump system to operate in a much more economical manner.

In carrying out the process of this invention, the filters, or filtering elements, are removed from either an oil filtering process or from a vacuum pump system. The filtering elements generally used in such processes are fabricated from paper and/or cellulose such as the Velcon filters identified as M/N CA-62202 and M/N F0718PLO-5 manufactured by Velcon Filters, Inc., San Jose, Calif. or the Fluitron filters manufactured by the Fluitron, Fluitec Corporation of Cookeville, Tenn. and identified as M/N C-6022-8P1 and M/N D061365-1052.

Figure 1:
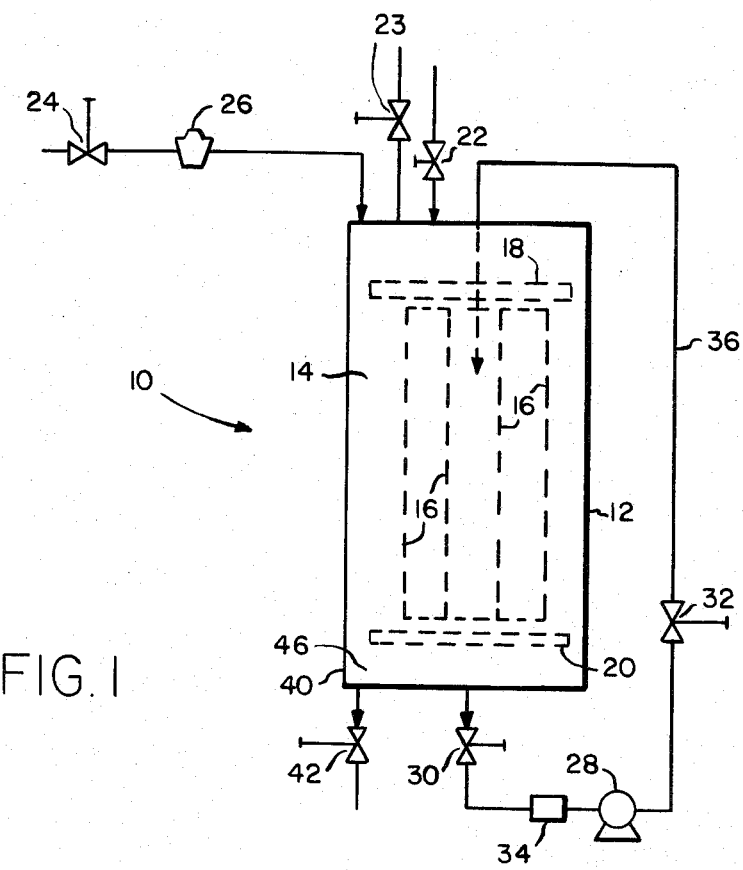
FIG. 1 represents, in schematic form, an extraction vessel and associated equipment found to be suitable for use in the treatment of oil saturated filters in accordance with the recovery process of the invention.

After removal from the oil filtering system, the halocarbon oil saturated filters are placed in an extraction vessel 10 of the type illustrated in FIG. 1. The vessel 10 comprises a tank 12 containing a solvent bath of (TCTFE) solvent 14. Oil saturated paper filters 16 are submerged in the bath 14 and then held in place in the vessel 12 by means of a top seal or lid 18 and a bottom seal 20. The solvent 14 is fed into the tank 12 through valve 22 from a source not shown. The solvent 14 dissolves the halogenated pump oil which saturates the filters and extracts it from the filter media.

The oil-saturated filters 16 are also laden with rust particles and other undesirable contaminants. The rust particles are predominantly $Fe_2O_3$ (Ferric Oxide). In order to remove the rust and avoid contaminating the extracted oil from the recovery process of this invention, two liters of water are added to the (TCTFE) solvent 14 thereby forming an aqueous phase together with the (TCTFE) solvent phase. Since the rust is more soluble in water, part of the rust is extracted to the aqueous phase of the solvent 14.

The process of recovering oil from the filters 16 is continued by opening valve 24 to feed compressed air from a source not shown to regulator 26. This pressurizes the vessel 12 to about 5-PSIG to make sure that pump 28 does not cavitate. Valves 30 and 32 are opened and pump 28 is started. A Viking positive displacement pump that pumps 2 gallons per minute at 10 feet of head has been found suitable for this purpose. When the pump runs: a solution containing (TCTFE), water, rust particles and dissolved oil is pumped out of the bottom 40 of the extraction vessel 12 through valve 30, strainer 34, pump 28, valve 32 and conduit 36 and into the interior portion of filters 16. The (TCTFE) then dissolves more oil as it passes through the filter material 16 back into the bottom 40 of extraction vessel 12. The strainer 34 serves the purpose of preventing large particles from clogging pump 28.

Figure 2:
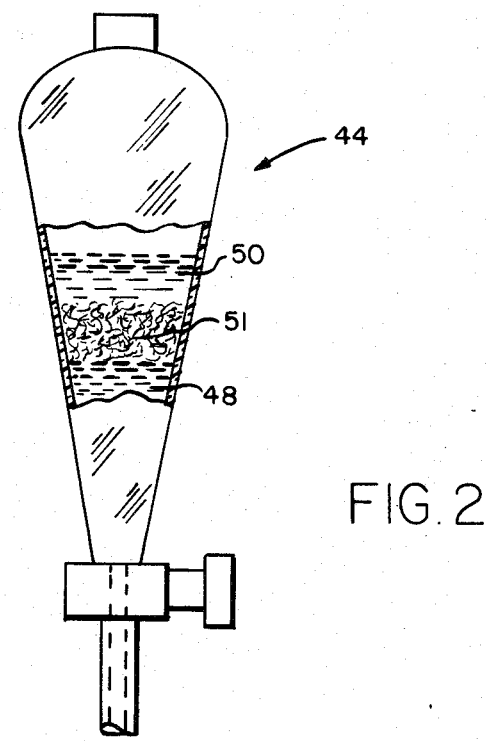
FIG. 2 represents in schematic form and partly broken away, a separatory vessel for use in the oil recovery process of this invention.

The pump 28 is run continuously for about 4 hours. The fluid is run at room temperature; but, if desired, it could be heated by conventional heating means, not shown. Elevating the temperature would permit the (TCTFE) to dissolve more oil. At the present time, the process of this invention, when run at room temperature, extracts about 42 percent of the oil from filter elements 16. After about four hours of operation, the pump 28 is turned off. Solution 46, which lies at the bottom 40 of extraction vessel 12, now comprises a (TCTFE) and halocarbon oil mixture 48 with water 50 floating on its surface. At this point, separation of the mixture 48 and water 50 is desireable since the water phase 50 contains undesireable contaminants while the mixture 48 contains the desired recovered oil end product. Separation of solution 46 into its component factions 48 and 50 is accomplished by opening valve 42 and permitting solution 46 to flow into a conventional separator apparatus, such as separatory funnel 44, shown in FIG. 2 of the drawings. The extraction vessel 12 is drained of solution 46 which pours into separatory funnel 44. At this point, vessel 12 can be vented by opening valve 23. Once the solution 46 is positioned in separating funnel 44, the (TCTFE) and halocarbon oil mixture 48 falls to the bottom of funnel 44 while the aqueous phase 50 rises to the top with rust contaminants lying near the aqueous-organic interface 51. Mixture 48 is now ready for further processing while the aqueous portion 50 can be disposed of.

After the (TCTFE)-halocarbon oil mixture 48 has been separated from aqueous phase 50, it is desireable to remove any remaining particulate matter, such as the rust particles located at interface 51. A conventional filter may be utilized and a simple paper filter and funnel have been found satisfactory. The filter paper characteristics are a matter of choice, but 10 $\mu$m paper gives a very clean (TCTFE)-oil mixture 48. The mixture 48 is filtered at this point because the viscosity of the mixture is lower than the viscosity of the oil itself which allows for quicker filtration. Also, cleaning the solution 48 at this point keeps the other apparatus and vessels free from particulate contaminants. The fraction 48 is now ready for distillation.

Figure 3:
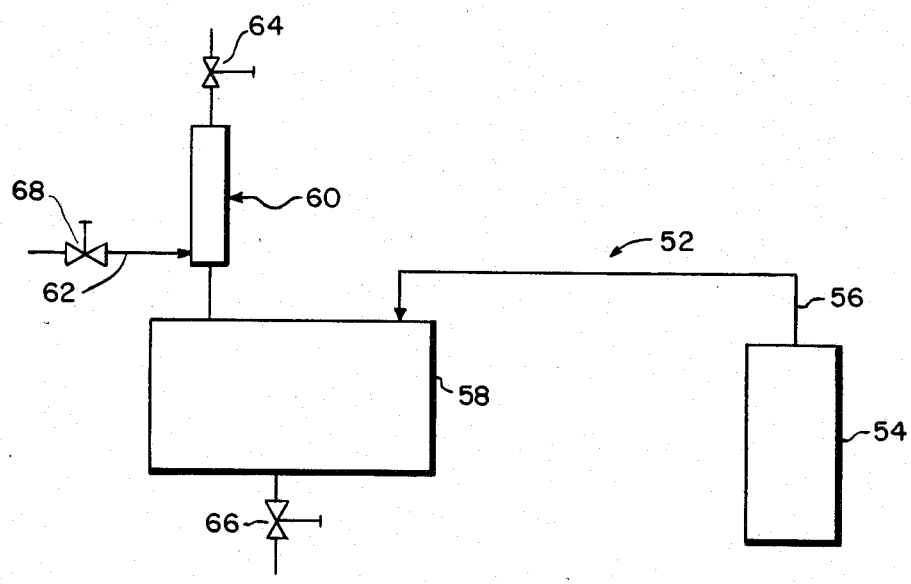
FIGS. 3 and 4 represent, in schematic form, distillation systems for use in the process of this invention.

The mixture 48 is placed in a distillation apparatus 52 as shown in FIG. 3. The apparatus 52 comprises a vessel 54 which can be heated by conventional heating means not shown. The mixture 48 is placed in vessel 54 along with boiling stones to facilitate boiling. Vessel 54 is heated until the mixture 48 starts to boil but should not exceed a temperature of about 50° C. A discharge conduit 56 is attached from vessel 54 to a catch tank 58 which in turn is vented to the atmosphere by means of condenser 60. The vapors resulting from heating mixture 48 in vessel 54 travel through conduit 56 into the catch tank 58.

The vapors in tank 58 cannot escape from the catch tank because cooling water at room temperature enters tank 58 through conduit 62 and valve 68 and causes the vapors to condense and drip back into the catch tank 58. During this process, valves 64 and 68 remain open. The oil-trichlorotrifluoroethane mixture 48 is distilled until boiling ceases. At this point, mostly oil is left in the heated vessel 54 while most of the (TCTFE) solvent remains in the catch tank 58. The solvent in the catch tank 58 is clean and can be reused as a solvent. To drain vessel 58, valve 66 is opened. The oil, with a small amount of residual solvent, contained in vessel 54 is now ready for vacuum distillation.

Figure 4:
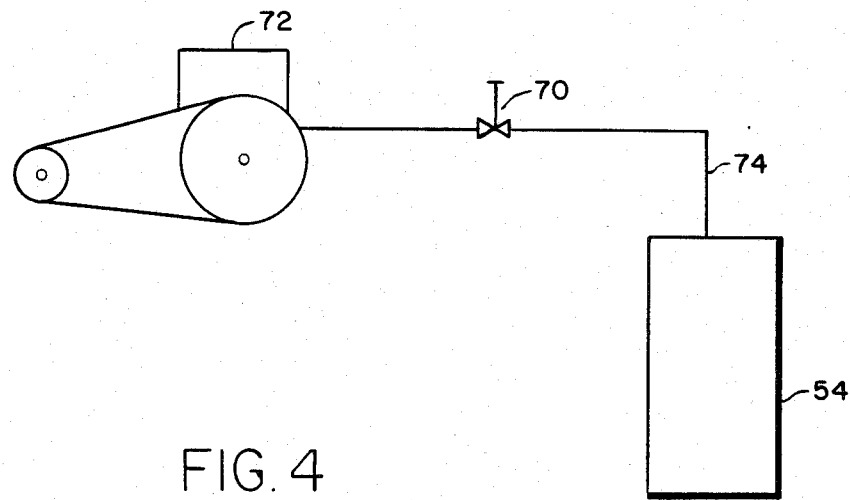

As shown in FIG. 4, the heated vessel 54, containing oil and a small amount of residual solvent, is attached to the inlet of a small vacuum pump 72 by means of conduit 74 and valve 70. The vacuum pump 72 has a capacity of about 60 liters/minute. The pump 72 is started and valve 70 is opened which brings the oil and residual solvent solution under vacuum and allows more of the residual solvent to evaporate from the mixture, yielding a more pure end product. The residual solvent vapors are drawn through the pump 72 and discharged. The oil solution can be heated at this point to offset any heat lost when the residual solvent evaporates. The final solution at about 50° C. and under vacuum for about 5 hours will only contain approximately 1.2 percent trichlorotrifluoroethane by weight. The remaining oil solution in vessel 54 is now ready to be removed and put back into the system it came from for reuse.

Although the present invention has been described by reference to a specific embodiment thereof, it should be understood that by those skilled in the art that the invention is capable of a variety of alternative embodiments and that all such embodiments, as are encompassed within the scope of the appended claims, are intended to be included herein.

What is claimed is:

1. A method for recovering halogenated oil from oil-saturated paper filters which comprises the steps of:
   a. providing an extraction vessel containing an extraction bath composed of a mixture of water and trichlorotrifluoroethane solvent;
   b. submerging halogenated oil-saturated paper filters into said extraction bath;
   c. pressurizing said extraction bath;
   d. circulating said mixture through said oil-saturated paper filters to extract oil therefrom;
   e. filtering said circulating mixture to prevent clogging of a circulating pump;
   f. removing a first solution from said extraction vessel;
   g. separating a solvent-oil phase and a water phase by gravity from said first solution;
   h. filtering said separated solvent-oil phase;
   i. distilling said separated solvent-oil phase at a temperature of about 50° C. for a period of time sufficient to effect the vaporization and removal of a substantial portion of solvent from said solvent-oil phase thereby providing a second solution containing oil and residual amounts of solvent;
   j. distilling said second solution under vacuum to vaporize and remove substantially all of said residual amounts of solvent therefrom thereby providing a third solution containing substantially all halogenated oil; and
   k. recovering said oil for subsequent reuse.

2. A method in accordance with claim 1 wherein said first mixture is composed of a ratio of about 6 to 10 parts by volume of trichlorotrifluoroethane and about one part by volume of water.

* * * * *